United States Patent

Meharry

[15] 3,654,751

[45] Apr. 11, 1972

[54] CUTTING APPARATUS FOR CORN DETASSELING AND SOYBEAN HARVESTING

[72] Inventor: James L. Meharry, Wingate, Ind.
[73] Assignee: Societe Nationale Des Petroles D'Aquitaine, Paris, France
[22] Filed: Feb. 12, 1971
[21] Appl. No.: 114,841

[52] U.S. Cl. .................................................56/56, 56/157
[51] Int. Cl. .........................................................A01d 45/02
[58] Field of Search..................56/56, 63, 53, 122, 157, 235, 56/503

[56] References Cited

UNITED STATES PATENTS 3,462,927  8/1969  Quick .........................................56/56

FOREIGN PATENTS OR APPLICATIONS 1,341,363  9/1963  France....................................56/157

Primary Examiner—Louis G. Mancene
Assistant Examiner—J. N. Eskovitz
Attorney—Woodard, Weikart, Emhardt & Naughton

[57] ABSTRACT

A cutting apparatus for use in detasseling stalks of corn and in harvesting soybeans. A cutter is mounted to a corn harvester or soybean combine and has a first disk slidingly contacting a pair of disks spaced apart. The first disk is rotatably mounted to a first tube and is rotatably driven. The pair of disks are mounted to a second tube parallel with and spaced apart from the first tube by a cross member. The pair of disks are rotatably driven at a speed and direction different from that of the first disk. Each disk has serrated edges. Gathering fingers are radially mounted to the disks and arms project outwardly from the tubes forming a funnel.

10 Claims, 5 Drawing Figures

PATENTED APR 11 1972 3,654,751

INVENTOR.
JAMES L. MEHARRY
BY
Woodard, Weikart, Emhardt & Naughton
ATTORNEYS

PATENTED APR 11 1972 3,654,751

INVENTOR.
JAMES L. MEHARRY
BY
Woodard, Weikart, Emhardt & Naughton
ATTORNEYS

CUTTING APPARATUS FOR CORN DETASSELING AND SOYBEAN HARVESTING

BACKGROUND OF THE INVENTION

Field of the Invention

This invention is in the field of cutting devices.

Description of the Prior Art

Applicant is aware of at least five prior farm implements which utilize disks or wheels for harvesting purposes. These devices are disclosed in the following U.S. Pat. Nos.: 1,539,346 issued to Bird; 1,608,107 issued to Loffer; 2,550,144 issued to Flintjer; 3,398,515 issued to Ash; and, 3,462,927 issued to Quick.

The Flintjer device is designed for severing beets and uses a pair of cutting disks with sharp edges. The other devices disclosed in the previously mentioned patents are designed to cut stalks. Many of these prior art devices utilize a pair of overlapping disks with the result that the item being cut is twisted from a vertical position to a somewhat sideways or horizontal position.

The pollen in a stalk of corn is located in the tassel at the top of the stalk and is very susceptible to being removed from the stalk by a force such as wind. It can be appreciated that when gathering the pollen with a machine the pollen may fall to the ground instead of into a container if the stalk is violently moved or twisted from a vertical position to a horizontal position. The present invention provides a pair of disks which abut the top and bottom surfaces of a single disk so as to remove the tassel from the stalk in such a manner that the pollen will be deposited in a container. The invention disclosed herein may also be utilized in the gathering of soybeans from a field. Soybeans are relatively fragile and will shatter or fall from the plant if the plant is moved violently. The cutter disclosed herein is mountable to a soybean combine with the disks previously described being operable to deposit the soybeans into the combine without shattering the soybeans or without allowing the soybeans to drop onto the ground.

SUMMARY OF THE INVENTION

The present invention is a cutting apparatus comprising a first frame, a first disk mounted to said frame and having a first fixed axis of rotation, said disk having a circumferential outer portion with a top and bottom surface, a second and third disk parallel to said first disk being mounted to said frame and having a single fixed axis of rotation parallel to but spaced from said first axis, said second disk having a bottom surface contacting said top surface of said outer portion and said third disk having an upper surface contacting said bottom surface of said outer portion, and, power means operable to rotate said first disk at a first speed in a first direction and to rotate said second and third disks at a speed and direction different than said first speed and said first direction.

It is an object of the present invention to provide a cutter which is operable to gently remove tassels from stalks of corn.

It is an additional object of the present invention to provide a cutter which is operable to gently gather soybeans.

Yet another object of the present invention is to provide a new and improved cutting apparatus having a first rotating disk in contact on its upper and lower surfaces with a pair of rotating disks.

Related objects and advantages of the present invention will be apparent from the following description.

DESCRIPTION OF THE PREFERRED EMBODIMENTS

Figure 1:
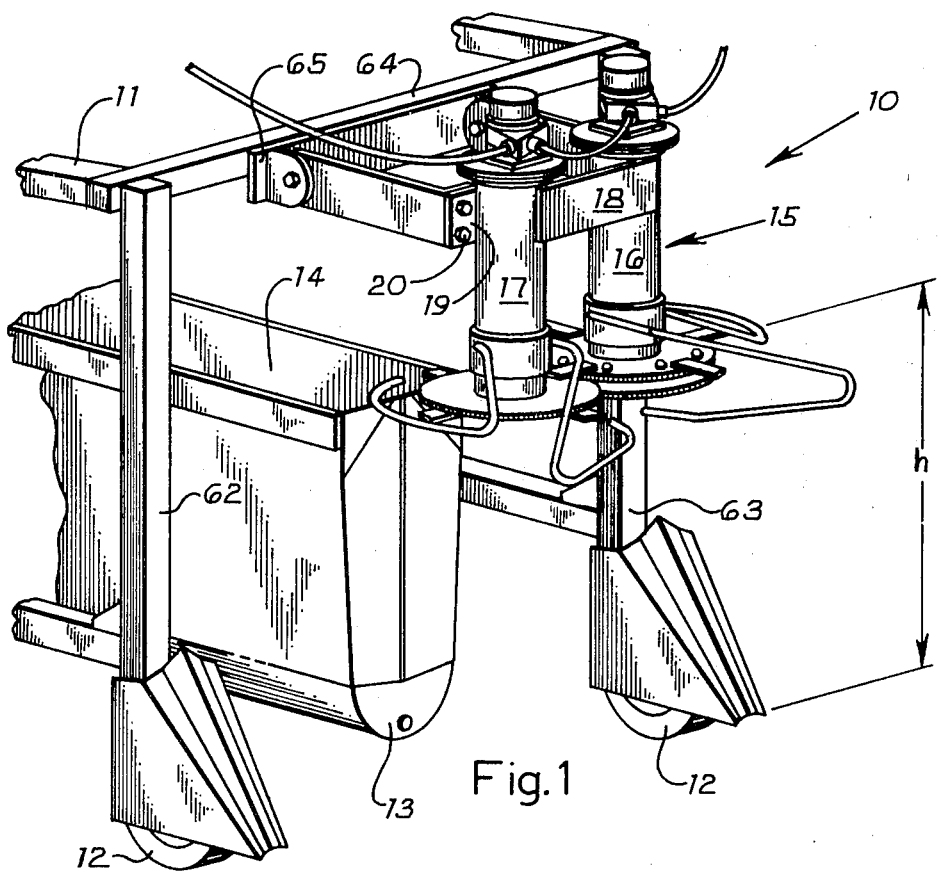
FIG. 1 is a fragmentary perspective front view of a corn harvester incorporating the present invention.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is partially shown a corn harvester 10 having a main frame 11 with wheels 12 rotatably mounted thereto. A container 13 is mounted to frame 11 by conventional brackets not shown. All sides and ends of container 13 are closed with the exception of the top end 14 which is opened. Frame 11 has a pair of vertical bars 62 and 63 spaced apart and fixedly secured to horizontal bar 64. Fixedly secured to horizontal bar 64 by welding or other suitable means is plate 65 which has cutter 15 removably mounted thereto.

Cutter 15 has a pair of parallel tubes 16 and 17 spaced apart and connected together by cross member 18. A pair of mounting brackets 19 (FIGS. 1 and 3) are secured to tubes 16 and 17 by welding or other suitable means and have flanged ends with holes provided thereon for receiving conventional fastening devices 20 (FIG. 1) which are threadedly received by a pair of arms secured to plate 65. Cutter 15 may be removed from harvester 10 by unthreading bolts 20. It is understood that the cutter may be secured to harvester 10 in an infinite number of different methods. In one embodiment, hydraulic motors mounted to the harvester were connected to the cutter so as to allow for controlled movement between frame 11 and cutter 15.

Tubes 16 and 17 (FIG. 3) are hollow and identical, each having a shaft extending therethrough. Shaft 48 is rotatably mounted within tube 16 fragmented at locations 68 and 69, having bearings 49 and 50 secured thereto. The bottom end 52 of shaft 48 passes through disks 22 and 23 and is threadedly received by hub 70. Shaft 48 has a keyway not shown which lockingly receives keys formed in disks 22 and 23 thereby preventing relative motion between the shaft and the disks. The top end 51 of shaft 48 is operably connected to power means 32 so as to be rotatable. Disks 22 and 23 and shaft 48 are rotatable about axis 27 which extends longitudinally through the center of shaft 48. Disks 22 and 23 are secured together by bolts 36 having shanks freely received by disks 22 and 23, spacers 37 and threadedly received by nuts 71. Bolts 36 are spaced around the disks to ensure that all portions of each disk are spaced uniformly apart. A center spacer 67 freely receives shaft 48 and has the same thickness as spacers 37. Disks 21, 22, and 23 are parallel as are axes 26 and 27. Disks 22 and 23 are spaced apart a distance equal to the thickness of disk 21 which is mounted to the bottom end 55 of shaft 53. The bottom end 55 has a keyway for lockingly receiving a key formed in disk 21 and is threaded so as to receive hub 70 for securing disk 21 to shaft 53. Shaft 53 extends through tube 17 and is rotatably mounted in bearings at the top and bottom of the tube in a manner identical to that previously described for shaft 48.

Figure 3:
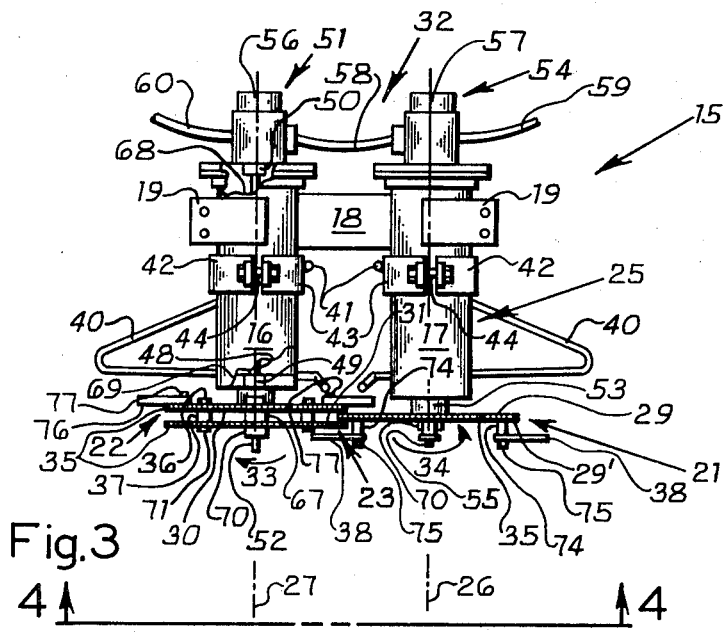
FIG. 3 is a fragmentary back view of the cutter 15 shown in FIG. 2.
Figure 4:
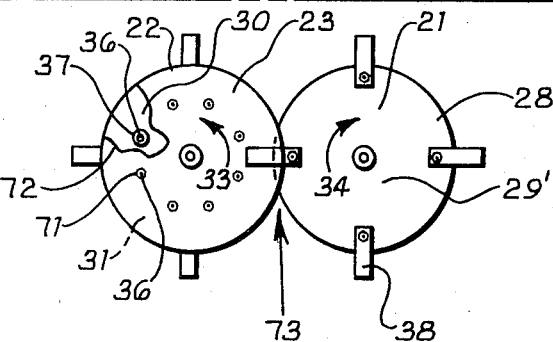
FIG. 4 is a partial bottom view of the cutter of FIG. 3 viewed in the direction of arrows 4—4.

Disk 21 has a top surface 29 which is in sliding contact with the bottom surface 30 of disk 22. Disk 21 also has a bottom surface 29' which is in sliding contact with the upper surface 31 of disk 23. FIG. 4 is a partial bottom view of the cutter of FIG. 3 viewed in the direction of arrows 4—4 showing that only the outer circumferential portion 28 of disk 21 engages disks 22 and 23. Disk 23 is broken away at area 72 to show spacer 37 and bolt 36. Shaft 53 (FIG. 3) has a top end 54 connected to power means 32 and is rotatable about axis 26 which extends through tube 17 and is parallel with axis 27. Disk 21 is rotatable about axis 26 in a direction of arrow 34 (FIG. 4) whereas disks 22 and 23 are rotatable about axis 27 in the direction of arrow 33.

A pair of hydraulic motors 56 and 57 are mounted atop the upper flanged ends respectively of tubes 16 and 17 and are operably connected to shafts 48 and 53. A source of pressurized fluid is connected to motor 57 via tube 59. The fluid passes through motor 57 exiting through tube 58 wherein it is then utilized to power motor 56 and returned to the source of pressurized fluid via tube 60. It has been found desirable to rotate disk 21 at an approximate speed of 450 revolutions per minute whereas disks 22 and 23 are rotated at an approximate speed of 850 revolutions per minute. As previously explained, disk 21 rotates in the direction of arrow 34 (FIG. 3) whereas disks 22 and 23 rotate in the opposite direction as shown by arrow 33. The different speeds of the disks allow sliding motion to exist between disk 21 and the pair of disks 22 and 23 thereby providing a better cutting action and ensuring that items do not become trapped between the disks. The outer edges 35 of disks 21, 22 and 23 are serrated so as to provide a gripping action. A variety of other power means 32 may be utilized to rotate the disks. For example, an electric motor may be mounted to some portion of frame 25 of cutter 15 being operably connected to shafts 48 and 53 through suitable gearing and chains. Of course, the disks would still be rotated in opposite directions at different speeds. Other power means could include a standard belt-pulley arrangement.

A plurality of fingers 38 (FIGS. 3 and 4) are mounted to disk 21 and are spaced away from the bottom surface 29' of the disk by spacers 74 a distance equal to the thickness of disk 23. Bolts 75 have shanks passing freely through spacers 74 being threadedly received in disk 21. These fingers extend radially from shaft 53 and are spaced from the bottom surface of disk 21 so as to not interfere with or touch disk 23. Similar fingers 76 are mounted to the top surface of disk 22 by bolts 77 and extend radially from shaft 48. As cutter 15 is moved across the field, the products being harvested are swept between the disks in the direction of arrow 73 by fingers 38 and 76.

A pair of clamps 42 (FIG. 3) embrace each tube, each having flanged ends for receiving standard fastening devices 44. Clamps 42 are adjustable along the length of tubes 16 and 17 by first loosening devices 44. Fastened to the inward walls 43 of clamps 42 are two arms 40 having their proximal ends 41 secured to walls 43 by welding or other suitable means. Each arm 40 (FIG. 5) has an elbow 45 spaced outwardly and in front of tubes 16 and 17. The arms slope downwardly from their proximal ends to their spaced-apart distal ends 46 so as to form a funnel 47, through which the products being harvested are directed. Arms 40 slope back toward cutter 15 from elbows 45 to distal ends 46.

A pair of guards 61 are mounted to clamps 42 at 78 extending downward into a half-moon configuration 80 adjacent to the outward side of disks 21, 22 and 23. In many cases, the disks are positioned quite high off the ground such as is shown in FIG. 1 by dimension $h$. For example, when gathering tassels from ears of corn the disks are positioned approximately 6 feet above the ground so as to gather the tassels from the stalk. Thus, it is possible for a person to accidentally touch the disks. Guards 61 extend around the outward side of the disks thereby preventing a person from accidentally touching the disks. The guards are not necessary when harvesting soybeans and may therefore be removed by removal of fastening devices 44 and replacement of clamp 42 with a clamp not having a guard attached thereon.

Figure 2:
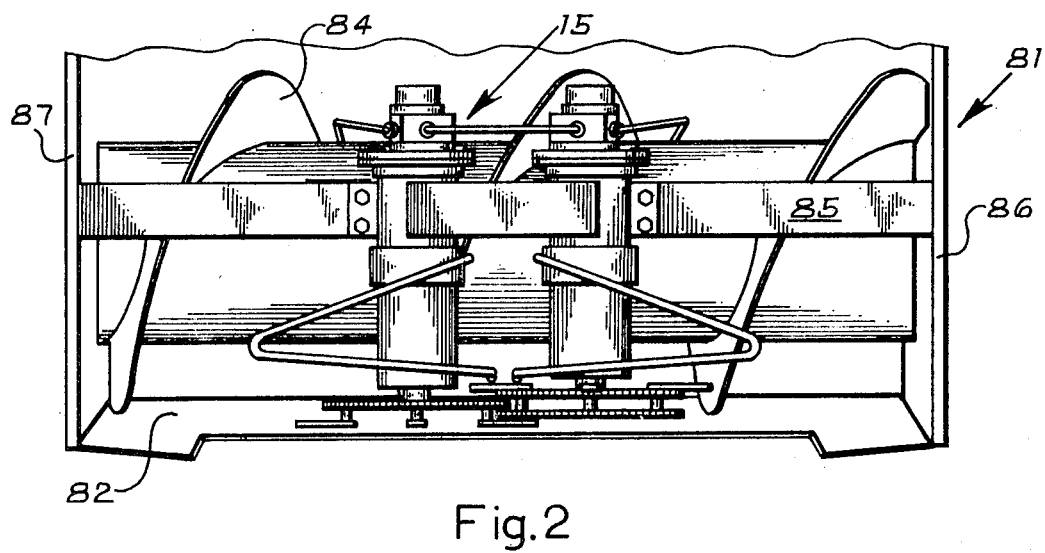
FIG. 2 is a fragmentary front view of a soybean combine incorporating the present invention.

FIG. 2 is a partial front view of a combine 81 with a cutter attached thereto for harvesting soybeans. Typically, soybean combines 81 have a trough with a bottom wall 82 positioned immediately over the ground for catching the soybean plants and conveying them to an auger 84 rotatably mounted within the trough which routes the soybean plants to a central location for separation. Cutter 15 is mounted in front of the trough so as to position the disks immediately in front of and partially over wall 82 and parallel with the ground at an approximate height of 5 inches above the ground. A variety of methods may be utilized to mount cutter 15 to combine 81. For example, a bar 85 may be fastened to the side walls 86 and 87 of the trough and the mounting brackets 19 (FIG. 3) may then be secured to bar 85 by conventional fastening devices. It should be understood, however, that many other methods may be utilized to mount the cutter to the soybean combine and that the above description does not limit the present invention.

A variety of materials may be utilized to produce cutter 15. In one embodiment, the disks were made of spring steel which was hardened for wearability. Tubes 16 and 17 were produced from stock tubing having an outside diameter of approximately 4 inches. The tubes were approximately 11 inches long and each disk was approximately 10 inches in diameter with a 5/8 inch overlap of disk 21 with respect to disks 22 and 23. In the same embodiment, shafts 48 and 53 had diameters of approximately 1 inch and were produced from cold rolled steel.

Figure 5:
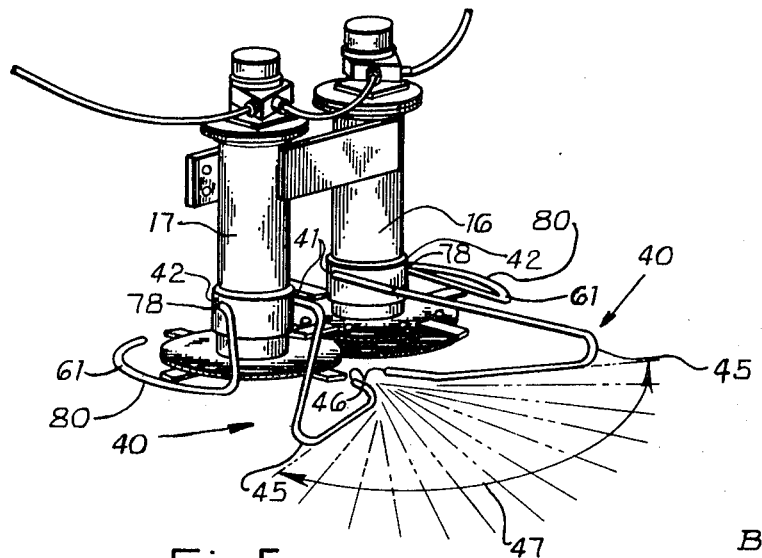
FIG. 5 is a front perspective view of the cutter of FIG. 1.

The arms 40 on cutter 15 as previously mentioned are adjustable along the length of tubes 16 and 17. Best results have been obtained by positioning the distal ends 46 (FIG. 5) of the arms 40 above disks 21, 22 and 23 when harvesting soybeans (FIGS. 2 and 3). On the other hand, when harvesting the pollen from corn stalks, it has been determined that it is best to position the distal ends 46 of arms 40 beneath disks 21, 22 and 23 (FIGS. 1 and 5). Whereas the arms 40 gather the stalks or soybeans in a row, the fingers attached to the disks allow for a sweeping action to ensure that all of the stalks or soybeans are gathered between the blades.

It will be evident from the above description that the present invention provides a cutter which is operable to gently remove the tassel from stalks of corn. It will be further evident from the above description that the cutter is also operable to gather soybeans. While the invention has been illustrated and described in detail in the drawings and foregoing description, the same is to be considered as illustrative and not restrictive, it being understood that only the preferred embodiments have been shown and that all changes and modifications that come within the spirit of the invention are desired to be protected.

The invention claimed is:

1. A cutting apparatus comprising:
    a first frame;
    a first disk mounted to said frame and having a first fixed axis of rotation, said disk having a circumferential outer portion with a top and bottom surface;
    a second and third disk parallel to said first disk being mounted to said frame and having a single fixed axis of rotation parallel to but spaced from said first axis, said second disk having a bottom surface contacting said top surface of said outer portion and said third disk having an upper surface contacting said bottom surface of said outer portion; and,
    power means operable to rotate said first disk at a first speed in a first direction and to rotate said second and third disks at a speed and direction different than said first speed and said first direction.

2. The apparatus of claim 1 wherein:
    said frame has a first and second tube with a cross member fixedly attached thereto, said first axis extends through said first tube and said single axis extends through said second tube;
    said second and third disks are secured together preventing relative motion therebetween; and,
    said first, second and third disks have outer serrated edges.

3. The apparatus of claim 2 additionally comprising:
    first fingers radially mounted to said first disk;
    second fingers radially mounted to said second disk; and,
    a pair of arms having upper proximal ends mounted to said frame and lower distal ends positioned adjacent said first, second and third disks, said arms forming a funnel to said first, second and third disks.

4. The apparatus of claim 3 and further comprising:
    mounting brackets fastened to said first and second tube;
    a first shaft rotatably mounted in and extending through said first tube and having a bottom end with said first disk secured thereto and a top end connected to said power means;

a second shaft rotatably mounted in and extending through said second tube having a bottom end with said second and third disks secured thereto and a top end connected to said power means; and, a spacer mounted between said second and third disks.

5. The apparatus of claim 4 wherein:

said power means is a first hydraulic motor connected to said first shaft and a second hydraulic motor connected to said second shaft, said power means having a pressurized fluid routed through said first motor and then through said second motor.

6. The apparatus of claim 5 additionally comprising:

guards mounted to said first and second tubes outwardly and adjacent said disks.

7. The apparatus of claim 6 additionally comprising:

a vehicle having a second frame with wheels rotatably mounted thereto;

a container mounted to said second frame and having an open top; and wherein:

said mounting brackets are connected to said second frame so as to position said first, second and third disks parallel with the ground and immediately in front of said container.

8. The apparatus of claim 7 wherein:

said distal ends of said arms are positioned beneath said first, second and third disks; and, said vehicle is a corn harvester.

9. The apparatus of claim 5 additionally comprising:

a vehicle having an open front scoop portion with a bottom wall and an auger rotatably mounted therein and wherein:

said mounting brackets are connected to said vehicle so as to position said first, second and third disks partially over and in front of said wall.

10. The apparatus of claim 9 wherein:

said vehicle is a soybean combine.

* * * * *

UNITED STATES PATENT OFFICE
CERTIFICATE OF CORRECTION

Patent No. 3,654,751   Dated April 11, 1972

Inventor(s) James L. Meharry

It is certified that error appears in the above-identified patent and that said Letters Patent are hereby corrected as shown below:

Please delete, in the Heading the following "Assignee:

Societe Nationale Des Petroles D'Aquitaine, Paris,

France"

Signed and sealed this 3rd day of October 1972.

(SEAL)
Attest:

EDWARD M. FLETCHER, JR.              ROBERT GOTTSCHALK
Attesting Officer                    Commissioner of Patents